US007873991B1

(12) United States Patent
Attwood et al.

(10) Patent No.: US 7,873,991 B1
(45) Date of Patent: Jan. 18, 2011

(54) TECHNIQUE OF DEFENDING AGAINST NETWORK FLOODING ATTACKS USING A CONNECTIONLESS PROTOCOL

(75) Inventors: Kira Sterling Attwood, Chapel Hill, NC (US); Linwood Hugh Overby, Jr., Raleigh, NC (US); Chien-En Sun, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1251 days.

(21) Appl. No.: 09/503,608

(22) Filed: Feb. 11, 2000

(51) Int. Cl.
 *G06F 9/00* (2006.01)
(52) U.S. Cl. .................................................. 726/11
(58) Field of Classification Search ......... 395/200–280; 370/113–501, 229, 429; 704/50–250; 710/52–57; 711/100; 380/4, 25; 709/225, 229; 713/200, 713/201, 190; 714/4, 18; 726/22, 23
 See application file for complete search history.

(56) References Cited

U.S. PATENT DOCUMENTS

| 5,878,224 | A  | * | 3/1999  | Smith ........................ 709/224 |
| 6,052,788 | A  | * | 4/2000  | Wesinger et al. ............ 713/201 |
| 6,125,397 | A  | * | 9/2000  | Yoshimura et al. .......... 709/235 |
| 6,182,226 | B1 | * | 1/2001  | Reid et al. .................. 713/201 |
| 6,219,728 | B1 | * | 4/2001  | Yin ............................. 710/52 |
| 6,317,786 | B1 | * | 11/2001 | Yamane et al. .............. 709/224 |
| 6,515,963 | B1 | * | 2/2003  | Bechtolsheim et al. ...... 370/229 |
| 6,725,378 | B1 | * | 4/2004  | Schuba et al. ............... 713/201 |
| 6,735,702 | B1 | * | 5/2004  | Yavatkar et al. ............. 713/201 |

FOREIGN PATENT DOCUMENTS

| JP | 09-218837    | 8/1997 |
| JP | 2000-032056  | 1/2000 |

OTHER PUBLICATIONS

W. Richard Stevens, TCP/IP Illustrated, vol. 1 The Protocols, Addison-Wesley, Copyright 1994 pp. 33, 143-147.*
CERT Advisory CA-96.01: "Topic UDP Port Denial-of-Service Attack"; vom 24. Sep. 1997; CERT Coordination Center, Software Engineering Institute, Carnegie Mellon University Pittsborugh Patentanspruch 15213-3890, USA.
Farrow, R. "TCP SYN Flooding Attacks and Remedies", Sep. 4, 1999.
Shiral, Y. "Why Asking for Bandwidth Control Technology", Computer & Network, OHM May 1, 199.

* cited by examiner

*Primary Examiner*—Ellen Tran

(57) ABSTRACT

The invention prevents server overload and possible server crippling due to a flooding of connectionless datagrams caused by intentional attack or otherwise. In response to a datagram from a host for a specified port, the number of datagrams already queued to the port from the host is determined. If this number exceeds a first threshold, the datagram is discarded. In the preferred embodiment, the threshold is determined by multiplying a percentage P by the number of available queue slots remaining for the port.

9 Claims, 1 Drawing Sheet

TECHNIQUE OF DEFENDING AGAINST NETWORK FLOODING ATTACKS USING A CONNECTIONLESS PROTOCOL

TECHNICAL FIELD

The invention relates generally to the field of networking and specifically to defending against attacks by malicious users attempting to disable a server by flooding the server with connectionless datagrams.

BACKGROUND OF THE INVENTION

Flooding attacks have recently been used with Increasing frequency to target and disable servers on the Internet. A flooding attack occurs when a user sends a large number of requests to a server in a relatively short period of time with an intent to overload and thereby disable the server. A flood of packets from a malicious user can overload a server in the same way that a flood of packets from a misconfigured system can overload a server. But the end result is the same; the server becomes overloaded in trying to service the requests. This prevents legitimate requests from being timely served and often disables a server or causes it to crash. A number of flooding attacks have been reported in the news recently on some well known web sites. These attacks were characterized by a flood of individual connection requests to establish initial communications. A related patent application Ser. No. 09/502,478 filed Feb. 11, 2000, discloses an algorithm to defend against such connection request attacks. However, it is also possible to attack a server by flooding it with connectionless datagrams, such as might occur in the UDP (user datagram) protocol. The effect is essentially the same; the server becomes overloaded in trying to service the horde of datagrams and can even become totally disabled. Flooding attacks are very difficult for traditional intrusion detection systems to prevent due to the difficulty of determining whether the traffic is legitimate or not.

SUMMARY OF THE INVENTION

The invention recognizes that the consequences of intentional datagram flooding attacks and unintentional overload situations resulting from a burst of datagrams can be mitigated by dropping the traditional notion of attempting to distinguish between legitimate and illegitimate traffic. In the invention, all datagram traffic is subject to a policy that attempts to guarantee that legitimate work will be performed and a server will not crash in flooding situations, irrespective of whether the flooding is caused by legitimate or illegitimate datagram traffic. The invention helps to prevent a server from crashing due to overload and it prevents one or more attackers from consuming all server resources.

In response to the arrival of a datagram destined for a specified port on a server, the transmitting host is determined and the number of datagrams already queued for the same host and for the same port is determined. If this number exceeds a first threshold, the request for a connection is denied.

The first threshold is dynamically determined in the preferred embodiment. The owner of a server specifies for each port that is subject to datagram flooding checks a maximum number of queued datagrams (M) allowed at any time to the port and a controlling percentage (P) of available queue slots remaining for the port. The invention keeps track of the number (A) of queued datagrams for the port and it calculates the number of available queue slots (I) by subtracting the number of queued datagrams from the maximum number of datagrams (I=M−A). If the number of datagrams already queued for the transmitting host is equal to or greater than P times the number of queue slots left (=>P*I), then the present datagram is refused. Otherwise, the datagram is queued and the number of queued datagrams (A) for the port is incremented by one.

The maximum number of datagrams and the threshold percentage P will be difficult for most owners to configure. Therefore, a "statistics" mode is provided that measures normal traffic loads of different servers and suggests an appropriate maximum and threshold that will not hamper similar legitimate traffic loads. This statistics mode is not part of the claimed invention and is not described further herein.

DETAILED DESCRIPTION

Figure 1:
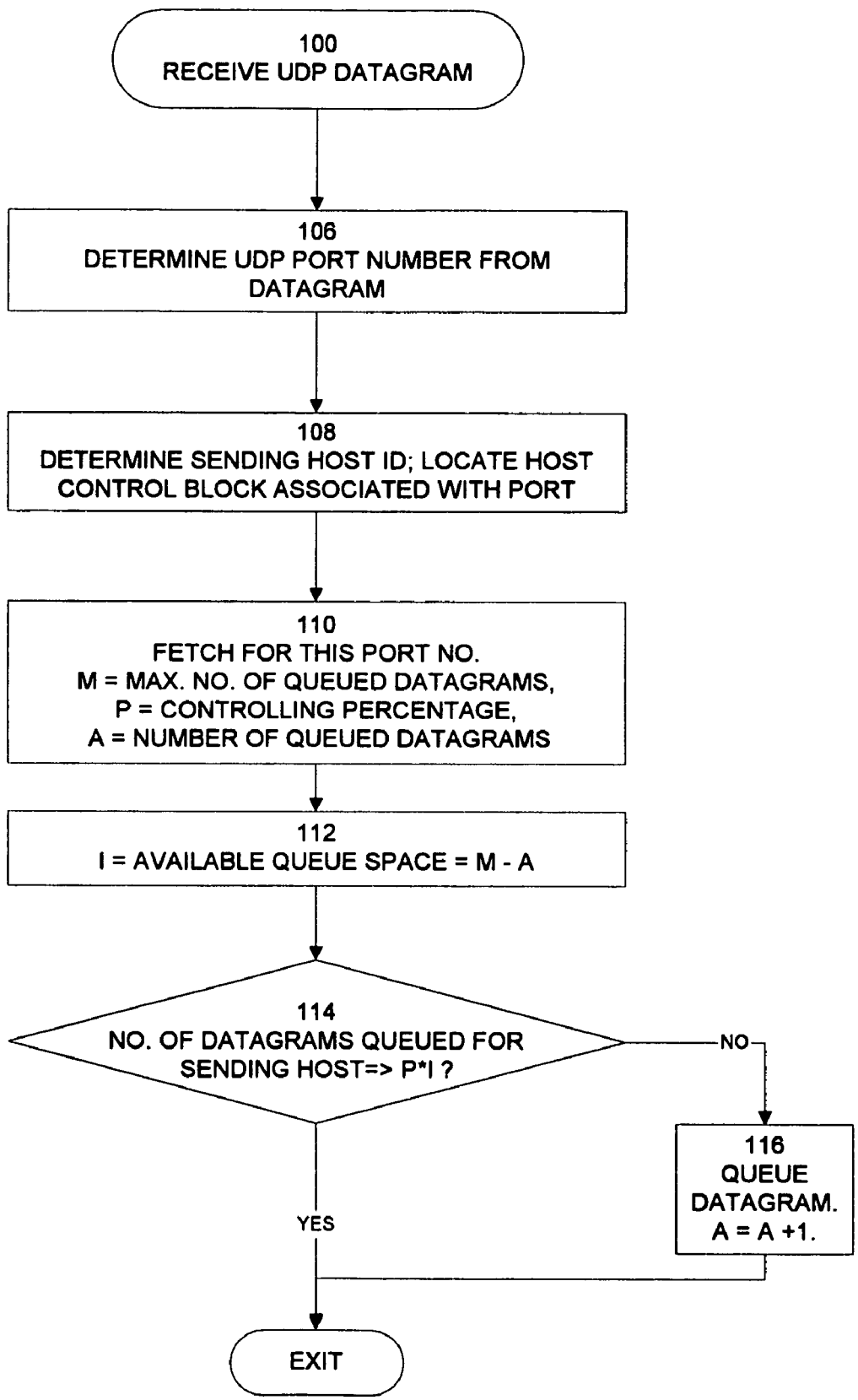
FIG. 1 shows an illustrative flowchart of operations executed at a server in response to the receipt of a datagram to ensure that a flooding situation does not prevent the completion of other work and does not crash the server.

The invention requires that an owner of a server that uses the invention configure the server with certain parameters for use by the invention. By way of example, the preferred embodiment requires that the owner specify for each port number subject to datagram flooding checks a maximum number of datagrams (M) allowed at any time to be queued to the port and a controlling percentage (P) of available queue slots remaining for the port. The percentage P is used to establish a threshold to trigger the denial to service a datagram. As datagrams are queued and serviced, the server dynamically maintains the number of available queue slots for each port that is subject to flooding checks.

An entry is made to step 100 in FIG. 1 when a datagram is received at a network server. The first step 106 determines from the datagram the port number to which the datagram is directed. The port number contained in a datagram represents a destination within a given host computer to which the datagram is to be delivered. Some ports are reserved for standard services. For example, the Network File System (NFS) is one example of a standard service that receives UDP datagrams.

The identity (the IP address) of the sending host is also determined from the datagram. The port number is used by step 108 to locate a memory control block for the port or to create one if a port control block does not presently exist. Attached to the port control block are a plurality of host control blocks for hosts that presently have one or more datagrams in queue. If the sending host does not have a host control block, one is created. A host control block contains, among other things, a count of the port connections presently assigned to the host.

Step 108 determines from the datagram the identity of the transmitting host that initiated the datagram and it uses the port number and the host identity to locate a memory control block or it creates a memory control block if one does not presently exist. An existing memory control block contains, among other things, a count of the number of datagrams presently queued by the host. Step 108 determines the port number to which this datagram is directed.

At step 110, the server fetches from the memory control block the maximum number of queued datagrams M specified for this port number, the controlling percentage P and the number A of queued datagrams. Step 112 calculates the number I of available queue slots as M−A. Step 114 determines if the number of datagrams already queued to the transmitting host is equal to or greater than P times I. If so, then the datagram is discarded and the queuing algorithm exits at 118. On the other hand, if the number of queued datagrams already initiated by the transmitting host is less than P times I, the datagram is queued for service at step 116 and A is incremented by one to update the number of datagrams in queue for this port number.

The computer program that has been described can be executed on virtually any type of computer, ranging from personal computers to large mainframes such as IBM's System 390 machines. The only requirement is that the computer is configured with network communication software and is accessible as a server via a network.

Skilled artisans in the fields to which the invention pertains will recognize that numerous variations can be made to the embodiments disclosed herein and still remain within the spirit and scope of the invention.

What is claimed is:

1. A method of preventing a flooding attack on a network server in which a large number of connectionless datagrams are received for queuing to a port on the network server, comprising:
   determining, in response to the arrival of a connectionless datagram from a host for a port on the network server, if the number of connectionless datagrams already queued to the port from the host exceeds a prescribed threshold, further comprising calculating the prescribed threshold by multiplying a percentage by the number of available queue slots for the port; discarding the datagram, if the number of connectionless datagram already queued to the port from the host exceeds the prescribed threshold; and
   queuing the connectionless datagram to a queue slot of the port, if the number of connectionless datagrams already queued to the port from the host does not exceed the prescribed threshold.

2. The method of claim 1 further comprising:
   configuring a maximum number of connectionless datagrams allowed to be queued at the port.

3. The method of claim 2 wherein the configuring step further includes configuring a controlling percentage of available queue slots remaining for the port; and wherein the prescribed threshold is based on the controlling percentage of available queue slots remaining for the port.

4. The method of claim 1 wherein the port comprises a plurality of queue slots, the method further comprising:
   maintaining a number of available queue slots of the plurality of queue slots for the port.

5. An apparatus for preventing a flooding attack on a network server in which a large number of datagrams are received for queuing to a port on the server, comprising:
   means for determining, in response to a datagram from a host for the port on the network server, if the number of datagrams queued on the port by the host exceeds a prescribed threshold, further comprising means for calculating the prescribed threshold by multiplying a percentage by a number of available queue slots for the port;
   means for discarding the datagram, if the number of datagrams queued on the port by the host exceeds the prescribed threshold; and
   means for queuing the datagram to a queue slot of the port, if the number of datagrams queued on the port by the host does not exceed the prescribed threshold.

6. The apparatus of claim 5 further comprising:
   a means for configuring a maximum number of connectionless datagrams allowed to be queued at the port.

7. The apparatus of claim 6 wherein the means for configuring further comprises means for configuring a controlling percentage of available queue slots remaining for the port.

8. A storage media containing program code that is operable by a computer for preventing a flooding attack on a network server in which a large number of datagrams are received for queuing to a port on the network server, the program code including instructions for causing the computer to execute the steps of:
   calculating a prescribed threshold by multiplying a percentage by a number of available queue slots for the port;
   determining, in response to receiving a datagram from a host for the port on the network server, if the number of datagrams already queued to the port from the host exceeds the prescribed threshold,
   discarding the datagram, if the number of datagrams already queued to the port from the host exceeds the prescribed threshold; and
   queuing the datagram to a queue slot of the port, if the number of datagrams already queued to the port from the host does not exceed the prescribed threshold.

9. The storage media of claim 8 wherein the computer is the network server.

* * * * *